United States Patent [19]

Okita

[11] 4,113,912

[45] Sep. 12, 1978

[54] HYDROPHILIC POROUS STRUCTURES AND PROCESS FOR PRODUCTION THEREOF

[75] Inventor: Koichi Okita, Osaka, Japan

[73] Assignee: Sumitomo Electric Industries, Ltd., Osaka, Japan

[21] Appl. No.: 823,474

[22] Filed: Aug. 10, 1977

[30] Foreign Application Priority Data

Aug. 10, 1976 [JP] Japan .................................. 51/95582
Jun. 21, 1977 [JP] Japan .................................. 52/74069

[51] Int. Cl.² .......................... D04H 1/58; B32B 27/04
[52] U.S. Cl. .................................... 428/290; 428/304; 428/421; 428/422; 427/316
[58] Field of Search ............... 428/304, 306, 141, 147, 428/421, 290, 422; 204/159.17; 264/127; 260/2.5 M; 427/316

[56] References Cited

U.S. PATENT DOCUMENTS

| 3,186,897 | 6/1965 | Hochberg | 428/421 |
| 3,390,067 | 6/1968 | Miller et al. | 204/159.17 |
| 3,407,249 | 10/1968 | Landi | 428/421 |
| 3,556,161 | 1/1971 | Roberts | 428/304 |
| 3,632,387 | 1/1972 | Sutherland | 427/316 |
| 3,666,693 | 5/1972 | Chapiro et al. | 260/2.5 M |
| 3,953,566 | 4/1976 | Gore | 264/127 |

*Primary Examiner*—William J. Van Balen
*Attorney, Agent, or Firm*—Sughrue, Rothwell, Mion, Zinn and Macpeak

[57] ABSTRACT

A hydrophilic porous structure comprising a porous fluorocarbon resin structure with the pores of the fluorocarbon resin structure containing at least one water-insolubilized water-soluble polymer and a process for the production thereof.

31 Claims, No Drawings

HYDROPHILIC POROUS STRUCTURES AND PROCESS FOR PRODUCTION THEREOF

BACKGROUND OF THE INVENTION

1. Field of the Invention

This invention relates to hydrophilic porous structures, and processes for their production.

2. Description of the Prior Art

Fluorocarbon resins, in spite of their excellent heat resistance and chemical resistance, are difficult to apply to systems involving water and aqueous salt solutions because they are hydrophobic. In an attempt to render a thin film of a fluorocarbon resin hydrophilic, Japanese Patent Publication No. 20742/61 and U.S. Pat. No. 3,666,693 disclose methods which involve grafting acrylic acid, 4-vinylpyridine, N-vinylpyrrolidone, etc. to the fluorocarbon resin using an ionizing radiation-induced or catalyzed polymerization reaction. According to these methods, however, graft copolymerization proceeds on the surface layer of the resin, but does not easily proceed in the interior of the resin. Hence, these methods cannot be used to achieve uniform hydrophilicity. On the other hand, U.S. Pats. Nos. 3,390,067 and 3,632,387 disclose that in order to extend graft polymerization into the interior of porous polytetrafluoroethylene, it is impregnated with a surface active agent and etched with sodium-naphthalene, etc., after which a polymerizable monomer is graft-copolymerized to the treated polytetrafluoroethylene thereby to render the polymer hydrophilic. Uniform hydrophilicity can be achieved using these methods when the polytetrafluoroethylene has a large pore size as in the case of a felt. However, with a smaller pore size, the etching treatment becomes non-uniform and results in a non-uniform hydrophilicity.

Hydrophilic polymeric membranes are used for separating substances in water-containing systems as membrane filters, dialysis membranes, ultrafiltration membranes, reverse osmosis membranes, etc. For these applications, the polymeric membranes need to have high percent rejection for solute, and superior mechanical strength when wet. Typically, cellulose ester membranes are considered to have superior permeability and mechanical characteristics, but for practical application, these properties should be improved further. The outstanding defects of cellulose ester membranes are their susceptibility to hydrolysis at excessively high acidity or alkalinity, and the decrease in their heat-resistant temperatures with smaller pore sizes.

A polyvinyl alcohol membrane has excellent permeability to water, but a very low mechanical strength. Generally, the permeability of a membrane tends to increase in proportion to the water absorption thereof, whereas the mechanical strength of a membrane tends to decrease with increasing water absorption. It is considered to be extremely difficult therefore to have both characteristics satisfied at the same time. On heat-treatment, a polyvinyl alcohol membrane becomes a water-insoluble membrane having superior permeation characteristics, but the mechanical strength of a polyvinyl alcohol membrane in the wet state is quite weak for practical application. The mechanical strength of a polyvinyl alcohol membrane could be increased by acetalization, etc., but on increasing the mechanical strength thereof, the water absorption of the membrane decreases and the permeability of the membrane is markedly reduced.

SUMMARY OF THE INVENTION

An object of this invention is, therefore, to render a porous fluorocarbon resin structure hydrophilic while reducing its hydrophobicity.

This object of the invention is achieved with a hydrophilic porous composite article or structure comprising a porous fluorocarbon resin structure with the pores of the fluorocarbon resin structure containing at least one water-insolubilized water-soluble polymer the structure being prepared by impregnating or coating the interior and surfaces of the pores of a porous fluorocarbon resin structure with an aqueous solution of a water-soluble polymer, and then cross-linking the water-soluble polymer until the water-soluble polymer becomes partly or completely insoluble in water although it remains wettable with water.

DETAILED DESCRIPTION OF THE INVENTION

Suitable fluorocarbon resins, as used in this invention, include polyvinyl fluoride, polyvinylidene fluoride, polytrifluorochloroethylene, polytetrafluoroethylene, and copolymers thereof. Specific examples of suitable copolymers are a vinylidene fluoride/tetrafluoroethylene copolymer, a perfluoroethylene/propylene copolymer (FEP for brevity), and a perfluoroalkyl ether/tetrafluoroethylene copolymer. Typical fluorocarbon resins, however, are polyvinylidene fluoride and polytetrafluoroethylene.

The porous structure is a structure in which the fluorocarbon resin forms a matrix and spaces are formed inside the resin extending from the surface of one side of the structure to the back of the structure. Closed cellular structures are not included in this definition.

The shape of the porous structure is optional, and may, for example, be a sheet, a tube or a rod.

The porous structure can be produced using various methods, such as a method which comprises mixing a fluorocarbon resin with a salt capable of being decomposed at a lower temperature than the melting point of the fluorocarbon resin to generate a gas, and molding the mixture, or a method which comprises mixing a fluorocarbon resin with a material capable of being removed by extraction or dissolution, molding the mixture under pressure, and then removing the material. A typical example of this method is described in U.S. Pat. No. 3,556,161. The porous structure can also be obtained by completely fiberizing polytetrafluoroethylene and then performing an operation similar to those used in producing non-woven fabrics or felts. For example, Japanese Patent Publication No. 11642/65 and U.S. Pat. No. 3,407,249 describes such an operation. Porous structures obtained by these methods mostly have a relatively low porosity, and it is considerably difficult to achieve a porosity of, for example, more than about 60%.

On the other hand, since polyvinylidene fluoride and vinylidene fluoride copolymers are soluble in specific solvents, they can be formed into porous structures having a porosity of more than about 60% by techniques similar to the method for producing cellulose ester membranes using a non-solvent.

As disclosed in Japanese Patent Publication No. 13560/67 and U.S. Pat. No. 3,953,566, a porous structure of polytetrafluoroethylene having a porosity of more than about 60% and up to as high as 96% in which the microstructure comprises nodes connected to one another by fibers can be obtained by stretching a polytetrafluoroethylene structure in at least one direction at a temperature below the crystal melting point of the polytetrafluoroethylene resin, and then heating the structure in the stretched state to a temperature above the crystal melting point of the polytetrafluoroethylene resin. The strength of the resulting porous structure is higher than those of products obtained by any of the other methods described above.

Porous structures produced by any of these methods can be used in this invention. However, those having a higher porosity and a higher strength are more preferred as a starting material in this invention. Porosity as described herein is determined by the method of ASTM D276-72 and the pore size distribution and bubble point as described herein are determined by the method of ASTM F316-70.

The water-soluble polymer, another starting material, is used to render the fluorocarbon resin hydrophilic while reducing the hydrophobicity of the fluorocarbon resin. According to conventional techniques, mixing of a large quantity of an inorganic filler having a high specific surface area has been attempted for improvement of hydrophilicity in addition to the graft-copolymerization thereto of hydrophilic monomers. However, this method has the defect that as the amount of the filler is increased, the resulting product is difficult to process under those processing conditions usually employed, and the mechanical strength of the final product is markedly reduced. Thus, this method has not gained general acceptance. Furthermore, graft-copolymerization of hydrophilic monomers as described above is economically disadvantageous because a complicated pre-treatment process is required, and a polymer of a hydrophilic monomer which is not grafted is formed.

Examples of preferred water-soluble polymers which can be used in this invention are oxygen-containing hydrocarbon polymers such as polyvinyl alcohol, polyethylene oxide, polyethylene glycol, methyl cellulose, ethyl cellulose, hydroxyethyl cellulose and hydroxypropyl cellulose, nitrogen-containing polymers such as polyacrylamide, polyvinylpyrrolidone, polyvinylamine, and polyethyleneimine, and electrically charged polymers such as polyacrylic acid, polymethacrylic acid and polystyrenesulfonic acid. These water-soluble polymers may be used individually or as mixtures of two or more thereof. A mixture of an uncharged water-soluble polymer and an anionic water-soluble polymer and a mixture of an uncharged water-soluble polymer and a cationic water-soluble polymer are especially preferred combinations. A mixture of an anionic water-soluble polymer and a cationic water-soluble polymer will result in a gel-like insoluble product as a result of neutralization.

Polyvinyl alcohol is a partially or completely saponified product of polyvinyl acetate and is available commerically. Thus, the quality of the polyvinyl alcohol such as the degree of polymerization is stable. A completely saponified polyvinyl alcohol product refers to those polyvinyl alcohols having a degree of saponification of about 98 to 99% and a partially saponified polyvinyl alcohol product to those having a degree of saponification of about 85 to 90%. The average degree of polymerization of the polyvinyl alcohol can vary from about 300 to about 2,500. The water solubility and viscosity of the polyvinyl alcohol vary depending on the degree of saponification and the degree of polymerization. Partially saponified products of polyvinyl acetate which have average degrees of polymerization more than about 1,000 are preferred in order to cross link them to a water-insoluble state after impregnation or coating in the porous structure of the fluorocarbon resin. A preferred concentration of an aqueous solution of polyvinyl alcohol is about 0.01 to about 12% by weight. If the concentration is outside this range, hardly any appreciable effect is observed, or the viscosity of the aqueous solution becomes too high and it is virtually impossible to fill the porous structure with the solution. The degree of saponification, the degree of polymerization, and the concentration of polyvinyl alcohol should be selected depending on the porosity, pore size, etc. of the porous structure to be coated or impregnated therewith.

Polyethylene oxide, polyethylene glycol, polyacrylamide, polyvinylpyrrolidone, and polyacrylic acid are also commercially available with varying degrees of polymerization. Since the viscosity of an aqueous solution of such a polymer varies greatly depending on the degree of polymerization of the polymer, the concentration of an aqueous solution of a polymer having an average degree of polymerization more than about 2,000 should be adjusted to a low concentration region, and that of an aqueous solution of a polymer having an average degree of polymerization less than about 1,000, to a high concentration region. In any case, the viscosity of the aqueous solution should be such that the solution can permeate through the pores of the fluorocarbon resin structures. The viscosity varies not only depending on the concentration of the solution, but also depending on the pH of the solution, the solution temperature, the amount of salts present in solution, the amount of time elapsed from the preparation of the solution, etc., but advantageous conditions can be determined relatively easily.

The water-soluble polymer can be employed also as a solution thereof in an organic solvent because the water-soluble polymer is also soluble in strongly polar solvents, such as dimethyl sulfoxide and dimethylformamide, and lower alcohols such as methanol and ethanol.

When the pore size of the porous fluorocarbon resin structure is small, the inside of the pores of the porous fluorocarbon resin cannot be filled directly with an aqueous solution of a water-soluble polymer such as polyvinyl alcohol. If this is the case the porous fluorocarbon resin structure is first immersed in a water-miscible solvent having a surface tension of not more than about 40 dynes/cm, such as ethanol, methanol, or acetone, or an aqueous solution of a surface active agent, as disclosed in Japanese Patent Publication No. 8505/67, and then immersed in water, whereupon the solvent diffuses into the water and only water fills the pores. The porous structure so treated is then immersed in an aqueous solution of the water-soluble polymer. In most cases, one is free to choose whether to immerse only one surface of the porous structure, or to immerse the porous structure entirely, although this somewhat differs according to the shape of the structure.

In order to impregnate the aqueous solution uniformly into the interior of the pores, a sufficient period of time for the water-soluble polymer to diffuse uniformly into the pores must be allowed to lapse after the immersion treatment before the treated porous structure is submitted to a crosslinking step. If this elapsed period is short, a high concentration of the water-soluble polymer exists at the surface of the porous structure but only a low concentration of the water-soluble polymer in the interior of the pores. Thus, the structure can be only insufficiently rendered hydrophilic. Another method for uniformly distributing the water-soluble polymer in the interior of the pores comprises repeating the procedure of immersing the porous structure in a dilute aqueous solution of the polymer and drying the impregnated porous structure. It has been confirmed that when the structure is impregnated with the aqueous solution and dried, contacting of the dried structure again with an aqueous solution of the water-soluble polymer readily facilitates a permeation of the aqueous solution into the inside of the pores. The concentration of the water-soluble polymer in the interior spaces increases by a factor of approximately two times.

Subsequently, the porous structure is subjected to a crosslinking treatment to water-insolublilize the water-soluble polymer. The insolubilization can be performed by any of heat-treatment, acetalization, esterification, a chemical reaction with potassium bichromate, and a crosslinking reaction using ionizing radiation, etc. The method must, however, be selected according to the properties of the matrix of the fluorocarbon resin forming the porous structure. Polyvinyl alcohol, polyethylene oxide, polyacrylic acid, etc. are readily water-soluble polymers. Insolubilization of these polymers can be achieved by changing the linear water-soluble polymer to a three-dimensionally crosslinked network structure.

Specifically, when linear polyvinyl alcohol is partially crystallized by heat-treatment, the polyvinyl alcohol molecule is found to have a portion which is crystalline and a portion which is not crystalline, and the solubility in water of the portion which is crystalline is lost as if it were chemically crosslinked. The portion which is not crystalline remains amorphous and retains its water solubility, but as a molecule of polyvinyl alcohol, it only swells upon contact with water and is no longer soluble in water.

When a chemical reaction such as acetalization, esterification or amidation or a crosslinking reaction by ionizing radiation occurs within one molecule of the water-soluble polymer, the linear structure of the molecule changes to a cyclic structure of the molecule. If such a reaction occurs between two molecules, the molecules change to a star-like molecule or a macrocyclic molecule. If the crosslinking reaction further proceeds and extends over many molecules, the polymer changes to a three-dimensional crosslinked structure. Thus, in order to perform the water-insolubilization of the water-soluble polymer using less crosslinking reactions, water-soluble polymers having higher degrees of polymerization are advantageous and a higher degree of swellability with water is achieved. It is essential after all to induce at least two crosslinking reaction sites into the same molecule. The number of crosslinking reactions needs to be increased with lower degrees of polymerization.

Insolubilization by heat-treatment is effective on completely saponified polyvinyl alcohol, and can be achieved by heating at about 150° to 160° C. for about 4 to 6 minutes, or at 200° C. for about 1 minute. At this time, the heat-treated product is preferably treated with hot water at about 90° C. or higher for at least 5 minutes. By heat-treatment, polyvinyl alcohol adheres intimately to the matrix of the porous structure and is crosslinked into a gelled structure. Thus, the porosity of the treated porous structure slightly decreases depending on the concentration of the polyvinyl alcohol impregnated or coated. However, the pore size of the structure and especially the maximum pore size and pore size distribution of the structure are scarcely different from those of the matrix structure in the starting material. For this reason, its permeability characteristics and mechanical characteristics as filter membranes are much the same as those of the starting material, and the range of applications of the resulting product to water and aqueous solutions can be broadened.

Insolubilization by acetalization is performed by adding an aldehyde such as formaldehyde and glyoxal and a mineral acid such as sulfuric acid to an aqueous solution of polyvinyl alcohol to induce a chemical reaction between the aldehyde and polyvinyl alcohol.

Insolubilization by esterification proceeds by mixing a carboxyl-containing polymer such as polyacrylic acid or polymethacrylic acid with an alcohol such as ethylene glycol, polyethylene glycol or polyvinyl alcohol, and adding a small amount of a mineral acid such as sulfuric acid or an alkali such as sodium hydroxide. Polyhydric alcohols such as ethylene glycol and glycerin are preferred to lower alcohols for three-dimensional crosslinking.

Water-insolubilization can also be achieved by an amidation reaction between a carbonyl group containing compound and an amino group containing compound. At least one of these compounds must be the water-soluble polymer, and of course, both of these compounds can be water-soluble polymers.

Water-insolubilization can be effected even when a mixture of two water-soluble polymers is used, and a water-insolubilizing reaction occurs only in one of the polymers while the other polymer does not at all participate in the reaction. In this case, if the reaction proceeds sufficiently, the other water-soluble polymer remains water-soluble, but loses its free diffusion ability because of its entanglement by the three-dimensionally crosslinked molecular structure. It appears as if the water-insolubilization also took place in the other polymer.

When polyacrylic acid is present during the acetalization reaction of polyvinyl alcohol, polyacrylic acid does not participate in this reaction, but cannot freely diffuse. This, in a broad sense, is defined also as a water-insolubilizing treatment in the present invention.

In addition to the various methods described above, polyvinyl alcohol can also be rendered water-insoluble by a partial oxidation reaction with potassium bichromate, etc., or by adding a precondensate of melamine, phenol, urea, etc., and allowing the polycondensation to proceed.

Polyethylene oxide forms an association product with polyacrylic acid and a precondensate of phenol, urea, etc. to form a three-dimensional crosslinkage in the broad sense and become water-insoluble.

Polyethyleneimine reacts with an aldehyde such as glyoxal, a ketone, an acid anhydride, an acid halide, etc. and becomes water-insoluble while forming an acid amide, an acid imide, etc. Furthermore, polyethyleneimine forms an association product with polystyrenesulfonic acid ad polyacrylic acid and becomes water-insoluble.

An electrically charged polymer such as polyacrylic acid, polymethacrylic acid or polystyrenesulfonic acid associates with a nitrogen-containing compound such as an acid amide, an amine or an imine. Preferably, the nitrogen-containing compound is a water-soluble polymer.

On the other hand, the crosslinking reaction of the water-soluble polymer and a crosslinking reaction of the porous structure can both take place in a water-insolubilizing treatment by ionizing radiation. Polyvinyl alcohol in the dried state decomposes more than crosslinks by ionizing radiation, and is generally called a "decomposable" plastic. It has been found however that in the presence of water, polyvinyl alcohol undergoes a crosslinking reaction predominantingly over a decomposition reaction. Polyacrylic acid, polyacrylamide, polyvinylpyrrolidone, polyethyleneoxide, etc. also undergo a crosslinking reaction.

Fluorocarbon resins forming the matrix of the porous structure can be calssified into two types—a type which is decomposed by ionizing radiation (for example, polytetrafluoroethylene) and a type which is crosslinked by ionizing radiation (polyvinylidene fluoride). It has been ascertained that in this case, too, the decomposition reaction somewhat decreases by irradiating the treated porous structure while the aqueous solution of the water-soluble polymer is impregnated in the pores of the structure so as to exclude oxygen in the air. In this way, the deterioration of the air-decomposable polytetrafluoroethylene porous structure by ionizing radiation in doses of 1 to 6 Mrads can be reduced by impregnating or coating an aqueous solution of the water-soluble polymer in the interiors of the porous spaces in the structure, and the gellation and crosslinking of the water-soluble polymer can be completed. If the irradiation dose is less than about 1 Mrad, the deterioration of the polytetrafluoroethylene matrix is further reduced. However, the degree of gellation and crosslinking of the water-soluble polymer is insufficient, and the polymer remains partly water-soluble. Hence, when the resulting product is applied to systems involving water or an aqueous solution, the water-soluble polymer diffuses and dissolves, and the hydrophilicity of the structure as a whole tends to be lost. When the irradiation does is above 6 Mrads, a marked decomposition of the polytetrafluoroethylene occurs.

On the other hand, since polyvinylidene fluoride and vinylidene fluoride copolymers can be crosslinked by ionizing radiation, the gellation and crosslinking of the water-soluble polymer can be performed with irradiation doses of about 1 to about 10 Mrads. Irradiation in a dose of up to about 20 Mrads can be employed as desired. At this point, the water-soluble polymer partly begins to decompose, but the hydrophilicity of the porous structure can be retained sufficiently.

A perfluoroethylene/propylene copolymer exhibits a behavior intermediate between those of polytetrafluoroethylene and polyvinylidene fluoride.

Although the gellation crosslinking conditions for the water-soluble polymer must be changed depending on the characteristics of the fluorocarbon resin used, the fluorocarbon resin structure can be rendered hydrophilic in all cases if the water-soluble polymer is crosslinked to a water-insoluble gel.

It has been found that the hydrophilicity of the crosslinked water-soluble polymer, especially the water content of the polymer in the wet state, varies greatly depending on whether water is present during the crosslinking reaction. In insolubilization by heat-treatment, any water present initially would be completely evaporated during heating at about 100° C. to form an ultrathin film of polyvinyl alcohol in the interior of and at the surface of the pores of the porous structure. Then, by heat-treatment at about 150° to 220° C., the film gradually changes to a water-insoluble crosslinked structure. For this reason, the crosslinked polyvinyl alcohol film should be swollen in a final step by treatment with hot water at about 90° C. or higher.

On the other hand, when a water-insolubilizing crosslinking reaction occurs while the water-soluble polymer such as polyvinyl alcohol is in the form of an aqueous solution, the density of crosslinking differs depending on the concentration of the aqueous solution of the water-soluble polymer, and when the water-soluble polymer is converted to a water-insoluble crosslinked product, the polymer is a gelled structure swollen to a high extent. Thus, the water swellability, or the water content, of the crosslinked structure differs depending on the method of crosslinking even when the same porous fluorocarbon structures, the same water-soluble polymers and the same concentrations of the aqueous solutions of the water-soluble polymers are employed.

A chemical reaction such as acetalization, esterification or amidation, and crosslinking by ionizing radiation are crosslinking reactions in the presence of water. Depending upon various factors such as the concentration of the aqueous solution of the water-soluble polymer, the concentration of the aldehyde used, the dosage of the ionizing radiation, the amount of thermosetting resin added, the temperature, and the time, a microporous swollen gel of the water-soluble polymer fills the inside of the pores of the porous fluorocarbon resin structure. It is surprising to note that the pore size of the microporous swollen gel varies from about 10 microns to about 0.01 micron or even to about 0.001 micron, and that the product can be employed in the field of hydrophilic polymeric membranes such as membrane filters, dialysis membranes, ultrafiltration membranes, and reverse osmosis membranes. While the porous fluorocarbon resin structure is strongly hydrophobic and has superior mechanical strength, the microporous swollen gel of the crosslinked water-soluble polymer is strongly hydrophilic and has a relatively weak mechanical strength. Thus, the hydrophobicity and hydrophilicity of the porous structure can be controlled, and superior mechanical strength can be retained in the resulting composite structure.

The following Examples are given to further illustrate the present invention. It should be understood that these Examples should not in any way be construed as limiting the scope of the invention. Unless otherwise indicated herein, all parts, percents, ratios and the like are by weight.

EXAMPLE 1

Poreflon FP-500 (a polytetrafluoroethylene membrane with an average pore size of 5 microns; tradename for a product of Sumitomo Electric Industries, Ltd.) was immersed in isopropyl alcohol, and then in water. Separately, aqueous solutions of Kuraray Poval PVA-217 (average degree of polymerization 1,750; degree of saponification 88 mole %; tradename for a product of Kuraray Co., Ltd.) (PVA) in a concentration of 1.25, 2.5, 5, and 10% by weight respectively, were prepared. Portions of the Preflon FP-500 immersed in water was immersed in each of the aqueous solutions of polyvinyl alcohol. One surface or both surfaces of the Poreflon membrane were immersed. Each of the immersed structures was intimately contacted with the surface of a metallic drum, and in this condition heat-treated at 90° C. for 20 minutes and then at 210° C. for 15 minutes. Finally, the heat-treated products were each treated for 10 minutes in hot water at 90° C. The characteristics of the membranes obtained are shown in Table 1 below.

Table 1

| Run No. | Concentration of PVA | Method of immersion | Tensile Strength | Water Content | Bubble Point | Water Permeation Time |
|---|---|---|---|---|---|---|
| | (wt.%) | | (kg/cm$^2$) | (%) | (kg/cm$^2$) | (sec.) |
| 1 | Untreated | — | 248 | 0 | 0.091 | 70 |
| 2 | 1.25 | Both surfaces | 266 | 39 | 0.076 | 37 |
| 3 | 1.25 | One surface | 270 | 25 | 0.075 | 27 |
| 4 | 2.5 | Both surfaces | 259 | 49 | 0.066 | 19 |
| 5 | 2.5 | One surface | 265 | 44 | 0.078 | 24 |
| 6 | 5.0 | Both surfaces | 292 | 52 | 0.075 | 38 |
| 7 | 5.0 | One surface | 281 | 48 | 0.078 | 29 |
| 8 | 10.0 | Both surfaces | 266 | 49 | 0.068 | 46 |
| 9 | 10.0 | One surface | 271 | 49 | 0.066 | 26 |

The tensile strength is that of the Poreflon membrane in the longitudinal direction thereof.

The water content is a value calculated from the weight difference of the membrane before and after the hot water treatment at 90° C.

The bubble point (determined by the method of ASTM F316-70) is the pressure at which the first bubble passes through the membrane after wetting the membrane with isopropyl alcohol.

The water permeation time is the time required for 1 liter of distilled water to pass through a 40 mmφ effective area with a pressure difference of 70 cmHg.

EXAMPLE 2

Aqueous solutions of polyacrylic acid having a degree of polymerization of about 2,500 in a concentration of 3, 5, 7 and 10% by weight were preapred. Poreflon FP-022 having an average pore size of 0.22 micron was immersed in isopropyl alcohol and then in water in the same manner as in Example 1. Portions of the Poreflon FP-022 were then immersed in each of the aqueous solutions of polyacrylic acid. After a lapse of 30 minutes, the excess of the aqueous solution adhering to the surface was squeezed off, and the membrane was sealed with a polyethylene sheet to avoid evaporation of water. The sealed membrane was treated with ionizing radiation using an electron beam accelerator. The characteristics of the resulting membranes are shown in Table 2 below.

Table 2

| Run No. | Concentration of Polyacrylic Acid | Irradiation Dosage | Tensile Strength (kg/cm$^2$) Longitudinal | Tensile Strength (kg/cm$^2$) Transverse | Water Content | Bubble Point | Water Permeation Time |
|---|---|---|---|---|---|---|---|
| | (wt.%) | (Mrad) | | | (%) | (kg/cm$^2$) | (sec.) |
| 10 | Untreated | 0 | 450 | 98 | 0 | 1.0 | 65 |
| 11 | 3 | 7 | 157 | 30 | 52 | 1.7 | 554 |
| 12 | 3 | 9 | 150 | 33 | 52 | 2.1 | 686 |
| 13 | 3 | 12 | 160 | 33 | 51 | 2.7 | 1126 |
| 14 | 5 | 7 | 142 | 42 | 53 | 2.8 | 1380 |
| 15 | 7 | 7 | 175 | 54 | 48 | 3.8 | 7200 |
| 16 | 10 | 7 | 205 | 69 | 52 | >5.0 | 22700 |
| 17 | 14 | 7 | 225 | 68 | 53 | >5.0 | 50000 |

The water permeation time used in this Example means the time required for 100 ml of distilled water to pass through a 40 mmφ effective area with a pressure difference of 4 kg/cm$^2$.

EXAMPLE 3

Aqueous solutions obtained in varying the concentrations of the same polyvinyl alcohol (PVA) as described in Example 1 and a polyvinylpyrrolidone (PVP) having a degree of polymerization of about 1800 were prepared, and Poreflon membranes having a pore size of 0.22 micron to 1.0 micron were immersed in each of the aqueous solutions, and then irradiated with electron beams. The results obtained are shown in Table 3 below.

Table 3

| Run No. | Concentration of Water-Soluble Polymer | Pore size of Membrane | Irradiation Dosage | Water content | Bubble Point | Water Permeation Time |
|---|---|---|---|---|---|---|
| | (wt.%) | (microns) | (Mrad) | (%) | (kg/cm$^2$) | (sec.) |
| 18 | PVA 2 | 1.0 | 3 | 92 | 0.38 | 127 |
| 19 | "4 | 1.0 | 3 | 100 | 1.4 | 1620 |
| 20 | "7 | 1.0 | 3 | 120 | 3.5 | 24000 |
| 21 | "4 | 0.3 | 1 | 115 | 2.4 | 11000 |
| 22 | "4 | 0.3 | 6 | 90 | 4.8 | 60800 |
| 23 | "4 | 0.65 | 6 | 91 | 4.5 | 49000 |
| 24 | PVP 8 | 0.22 | 6 | 105 | 4.1 | 70000 |

Table 3-continued

| Run No. | Concentration of Water-Soluble Polymer | Pore size of Membrane | Irradiation Dosage | Water content | Bubble Point | Water Permeation Time |
|---|---|---|---|---|---|---|
| 25 | "8 | 0.3 | 6 | 100 | 3.8 | 50000 |
| 26 | "8 | 0.65 | 6 | 120 | 3.0 | 32000 |

It is seen from the results obtained that the characteristics (water content, bubble point, water pemeation time) of the hydrophilic membranes varied depending on the pore sizes of the starting membranes, the concentration of the water-soluble polymer, and the dosage of the ionizing irradiation.

EXAMPLE 4

Aqueous solutions in varying concentrations of Kuraray Poval PVA-117 (average degree of polymerization 1750; degree of saponification 98.5 mole %; tradename for a product of Kuraray Co., Ltd.) and the same polyacrylic acid as described in Example 2 were prepared. Poreflon membranes having various pore sizes were immersed in each of the solutions using the same procedures as described in Example 1, and then immersed in an acetalization bath containing formaldehyde or glyoxal under the conditions shown in Table 4 below. The acetalization bath was prepared by adding 20 parts of 96% sulfuric acid and 2 parts of sodium sulfate to 100 parts of an aqueous solution of the aldehyde of a concentration of about 40%. The characteristics of the treated membranes are shown in Table 4 below.

Table 4

| Run No. | Acetalization Conditions Aldehyde | Temperature (° C) | Time (min.) | Type and Concentration of Water-Soluble Polymer (wt.%) | Pore size of Impregnated Membrane (microns) | Water Content (%) | Bubble Point (kg/cm²) | Water Permeation Time (sec.) |
|---|---|---|---|---|---|---|---|---|
| 27 | Untreated | | | — | 0.22 | 0 | 0.95 | 12 |
| 28 | Formaldehyde | RT | 2 | PVA 2 | 0.22 | 28 | 0.97 | 15 |
| 29 | " | " | " | PVA 6 | 0.22 | 43 | 1.2 | 30 |
| 30 | Untreated | | | — | 0.45 | 0 | 0.75 | 9 |
| 31 | Glyoxal | RT | 20 | PVA 8 | 0.45 | 80 | 1.2 | 1400 |
| 32 | " | " | 2400 | PVA 8 | 0.45 | 70 | 3.5 | 25000 |
| 33 | Untreated | | | — | 1.5 | 0 | 0.21 | >5 |
| 34 | Glyoxal | 80 | 12/60 | PVA 8 | 1.5 | 60 | 0.68 | 10 |
| 35 | " | " | 7/60 | PVA 8 | 1.5 | 100 | 0.52 | >5 |
| 36 | " | " | 5/60 | PVA 8 | 1.5 | 110 | 0.35 | >5 |
| 37 | " | " | 5/60 | PVA 1.5 PAA 5 | 1.5 | 50 | 0.75 | 15 |
| 38 | " | " | 5/60 | PVA 3 PAA 5 | 1.5 | 75 | 0.68 | >5 |
| 39 | Glyoxal | 80 | 5/60 | PVA 5 PAA 5 | 1.5 | 80 | 0.62 | >5 |
| 40 | Untreated | | | — | 2.0 | 0 | 0.15 | >5 |
| 41 | Glyoxal | 100 | 12/60 | PAA 3 | 2.0 | 30 | 0.16 | >5 |
| 42 | " | " | 12/60 | PAA 6 | 2.0 | 35 | 0.17 | >0 5 |

RT - Room Temperture (about 20-30° C)
PAA - Polyacrylic acid
The fractions shown in Table 4 above retative to time in which the unit is "min.", i.e., 12/60, etc. indicate 12 seconds, etc.

EXAMPLE 5

A copolymer of vinylidene fluoride and tetrafluoroethylene was formed into membranes. The membranes were irradiated with electron beams in the same manner as described in Example 2. Since these copolymers were readily soluble in acetone or methyl ethyl ketone, they can be readily formed into porous films in the same manner as in the preparation of cellulose acetate films.

Forty grams of Copolymer 1 (tetrafluoroethylene content: 30.7 mole %; melting point: 140° C.; intrinsic viscosity at 35° C. in dimethylformamide: 2.39) was dissolved in 360 ml of acetone and 45 ml of isopropyl alcohol to form a uniform solution.

Separately, Copolymer 2 (tetrafluoroethylene content: 4.2 mole %; melting point 145° C.; intrinsic viscosity at 35° C. in dimethylformamide: 2.61) was uniformly dissolved in 250 ml of dimethylformamide, 120 ml of acetone and 50 ml of isopropyl alcohol.

Each of these solutions was coated on a stainless steel belt in a thickness of 0.9 mm using a doctor blade, and dried in an atmosphere at 20° C. for 5 minutes, followed by immersion in water at 10° C. In the water, a thin film of each copolymer was formed, and all of the organic solvent diffused into the water.

The films of Copolymer 1 and Copolymer 2 were each immersed completely in a 10% aqueous solution of polyvinyl alcohol (Kuraray Poval PVA-217), and then sealed with a polyethylene sheet. In the same manner as in Example 2, the films were each irradiated with electron beams at a dosage of 6 Mrads. The characteristics of the membranes obtained are shown in Table 5 below.

Table 5

| Run No. | Resin | Time of Electron Beam Irradiation | Water Content (%) | Thickness (mm) | Tensile Strength (g/cm width) |
|---|---|---|---|---|---|
| 43 | Copolymer 1 | Before treatment | 45 | 0.125 | 406 |
| 44 | " | After treatment | 215 | 0.397 | 668 |
| 45 | Copolymer 2 | Before treatment | 35 | 0.105 | 786 |
| 46 | " | After | 145 | 0.26 | 966 |

Table 5-continued

| Run No. | Resin | Time of Electron Beam Irradiation treatment | Water Content | Thickness | Tensile Strength |
|---|---|---|---|---|---|

It can be seen from the results obtained above that in spite of an increase in the thickness of the membrane after irradiation, the tensile strength of the membrane slightly increased.

EXAMPLE 6

A commercially available 30% aqueous solution of polyethyleneimine was diluted with isopropyl alcohol to form a 5% solution. A Poreflon membrane having an average pore size of 0.22 micron and Copolymer 1 as described in Example 5 were each emmersed for 10 minutes in the polyethyleneimine solution. After drying in air, each of the membranes was immersed for 2 minutes in a 4% aqueous solution of glyoxal at room temperature, and washed with water. The Poreflon membrane had a bubble point of 1.110 kg/cm$^2$, and Copolymer 1 membrane had a bubble point of 1.08 kg/cm$^2$. Immersion in the aqueous polyethyleneimine solution and drying were repeated two times, and the membranes were treated with glyoxal. The bubble point became 1.30 kg/cm$^2$ (Poreflon) and 1.15 kg/cm$^2$ (Copolymer 1). When the procedure was repeated three times, the bubble point became 1.69 kg/cm$^2$ (Poreflon), and 1.75 kg/cm$^2$ (Copolymer 1).

EXAMPLE 7

A 1% aqueous solution of PEO-3 (a trademark for polyethylene oxide, a product of Seitetsu Kagaku Co., Ltd. average degree of polymerization: 12,000) was prepared. A Poreflon membrane having an average pore size of 0.45 micron was treated in a manner similar to that described in Example 1, and then the membrane was immersed in this solution for 20 minutes.

Separately, a 1% aqueous solution of the polyacrylic acid as described in Example 2 was prepared. When the membrane impregnated with the PEO-3 aqueous solution contacted the polyacrylic acid solution, a viscous deposit immediately formed. Even with sufficient washing with water, this deposit did not flow out, but remained adhered to the membrane. The membrane was dried at 90° C. When the membrane contacted water, the membrane was observed to be completely hydrophilic.

EXAMPLE 8

A 3% aqueous solution of the polyacrylic acid as described in Example 2 was prepared, and impregnated in a membrane of Copolymer 2 having an average pore size of 0.45 micron. A solution of 10 parts of ethylene glycol and 1 part of sulfuric acid was prepared, and the impregnated membrane was immersed in this solution at room temperature for 20 seconds. The membrane was then heated at 80° C. for 4 minutes, and washed with water. The bubble point of the membrane before treatment was much the same as that of the membrane after treatment. The treated membrane had a water content of 35%, and after the membrane was completely dried, the membrane was found to be readily hydrophilic upon contact with water.

While the invention has been described in detail and with reference to specific embodiments thereof, it will be apparent to one skilled in the art that various changes and modifications can be made therein without departing from the spirit and scope thereof.

What is claimed is:

1. A hydrophilic porous structure comprising a porous fluorocarbon resin structure with the pores of the fluorocarbon resin structure containing at least one water-isolubilized water-soluble polymer.
2. The structure of claim 1, wherein the water-insolubilized polymer is partly or wholly crosslinked to form a microporous swollen gel.
3. The structure of claim 1, wherein the water-soluble polymer is a hydroxyl group-containing polymer.
4. The structure of claim 2, wherein the water-soluble polymer is a hydroxyl group-containing polymer.
5. The structure of claim 3, wherein the hydroxyl group-containing polymer is polyvinyl alcohol.
6. The structure of claim 4, wherein the hydroxyl group-containing polymer is polyvinyl alcohol.
7. The structure of claim 1, wherein the water-soluble polymer is a carboxyl group-containing polymer.
8. The structure of claim 2, wherein the water-soluble polymer is a carboxyl group-containing polymer.
9. The structure of claim 7, wherein the carboxyl group-containing polymer is polyacrylic acid.
10. The structure of claim 8, wherein the carboxyl group-containing polymer is a polyacrylic acid.
11. The structure of claim 1, wherein the water-soluble polymer is a nitrogen containing polymer.
12. The structure of claim 2, wherein the water-soluble polymer is a nitrogen-containing polymer.
13. The structure of claim 11, wherein the nitrogen-containing polymer is polyacrylamide.
14. The structure of claim 12, wherein the nitrogen-containing polymer is polyacrylamide.
15. The structure of claim 11, wherein the nitrogen-containing polymer is polyvinylpyrrolidone.
16. The structure of claim 12, wherein the nitrogen-containing polymer is polyvinylpyrrolidone.
17. The structure of claim 1, wherein the water-soluble polymer is a mixture of a hydroxyl group-containing polymer and a carboxyl group-containing polymer.
18. The structure of claim 2, wherein the water-soluble polymer is a mixture of a hydroxyl group-containing polymer and a carboxyl group-containing polymer.
19. The structure of claim 1, wherein the water-soluble polymer is a mixture of a hydroxyl group-containing polymer and a nitrogen-containing polymer.
20. The structure of claim 2, wherein the water-soluble polymer is a mixture of a hydroxyl group-containing polymer and a nitrogen-containing polymer.
21. The structure of claim 1, wherein the porous fluorocarbon resin structure is a porous polytetrafluoroethylene structure.
22. The structure of claim 2, wherein the porous fluorocarbon resin structure is a porous polytetrafluoroethylene structure.
23. The structure of claim 21, wherein the porous polytetrafluoroethylene has a microstructure containing nodes connected to one another by fibers.
24. The structure of claim 22, wherein the porous polytetrafluoroethylene has a microstructure containing nodes connected to one another by fibers.
25. The structure of claim 1, wherein the porous fluorocarbon resin structure is a porous polyvinylidene fluoride structure.

26. The structure of claim 2, wherein the porous fluorocarbon resin structure is a porous polyvinylidene fluoride structure.

27. A process for producing the porous structure of claim 1, which comprises impregnating the pores of a porous fluorocarbon resin with at least one water-soluble polymer including polyvinyl alcohol, and water-insolubilizing the polyvinyl alcohol by heat-treatment.

28. The process for producing the porous structure of claim 1, which comprises impregnating the pores of a porous fluorocarbon resin with at least one water-soluble polymer, and water-insolubilizing a part or all of the water-soluble polymer by acetalization.

29. A process for producing the porous structure of claim 1, which comprises impregnating the pores of a porous fluorocarbon resin with at least one water-soluble polymer including polyvinyl alcohol, and water-insolubilizing the polyvinyl alcohol by acetalization.

30. A process for producing the porous structure of claim 1, which comprises impregnating the pores of a porous fluorocarbon resin with at least one water-soluble polymer including a carboxyl group-containing water-soluble polymer, and water-insolubilizing a part or all of the carboxyl group-containing water-soluble polymer by esterification.

31. A process for producing the porous structure of claim 1, which comprises impregnating the pores of a porous fluorocarbon resin with at least one water-soluble polymer, and water-insolubilizing a part or all of the water-soluble polymer using ionizing radiation.

* * * * *